(12) United States Patent
Jin

(10) Patent No.: US 9,310,537 B2
(45) Date of Patent: Apr. 12, 2016

(54) COLOR FILTER SUBSTRATE AND DISPLAY DEVICE

(71) Applicants: BOE Technology Group Co., Ltd., Beijing (CN); Chengdu BOE Optoelectronics Technology Co., Ltd., Chengdu (CN)

(72) Inventor: Fujiang Jin, Beijing (CN)

(73) Assignees: BOE Technology Group Co., Ltd., Beijing (CN); Chengdu BOE Optoelectronics Technology Co., Ltd., Chengdu (CN)

( * ) Notice: Subject to any disclaimer, the term of this patent is extended or adjusted under 35 U.S.C. 154(b) by 31 days.

(21) Appl. No.: 14/313,326

(22) Filed: Jun. 24, 2014

(65) Prior Publication Data

US 2015/0226890 A1 Aug. 13, 2015

(30) Foreign Application Priority Data

Feb. 10, 2014 (CN) .......................... 2014 1 0046705

(51) Int. Cl.
*G02F 1/03* (2006.01)
*G02B 5/20* (2006.01)
*G02F 1/01* (2006.01)
*G02F 1/1335* (2006.01)
*G02B 5/23* (2006.01)

(52) U.S. Cl.
CPC ................ *G02B 5/201* (2013.01); *G02B 5/23* (2013.01); *G02F 1/0126* (2013.01); *G02F 1/133514* (2013.01)

(58) Field of Classification Search
CPC ....................................................... G02B 5/201
USPC .......................................................... 359/242
See application file for complete search history.

(56) References Cited

U.S. PATENT DOCUMENTS

2015/0146077 A1* 5/2015 Keelan ................ H04N 5/3696
348/342

FOREIGN PATENT DOCUMENTS

| CN | 102707510 A | 10/2012 |
| CN | 103268881 A | 8/2013 |
| CN | 103305153 A | 9/2013 |
| JP | 2003-43241 A | 2/2003 |

OTHER PUBLICATIONS

First Office Action, including Search Report, for Chinese Patent Application No. 201410046705.7, dated Dec. 1, 2015, 12 pages.

* cited by examiner

*Primary Examiner* — James Jones
(74) *Attorney, Agent, or Firm* — Westman, Champlin & Koehler, P.A.

(57) ABSTRACT

A color filter substrate and a display device are provided. The color filter substrate comprises a substrate; a color filter layer provided on the substrate; and a photochromic material, the photochromic material and the color filter layer cooperating to display different colors by adjusting the light irradiated onto the color filter substrate. In the color filter substrate and the display device, the photochromic material is introduced into the color filter substrate. In this way, by adjusting the light emitted from the backlight source, the photochromic material is excited to display different colors and the color gamut of the pixel units is thus changed. This color filter substrate and liquid crystal panel can be better applied to different environments.

18 Claims, 3 Drawing Sheets

COLOR FILTER SUBSTRATE AND DISPLAY DEVICE

CROSS-REFERENCE TO RELATED APPLICATION

This application claims the benefit of Chinese Patent Application No. 201410046705.7 filed on Feb. 10, 2014 in the State Intellectual Property Office of China, the whole disclosure of which is incorporated herein by reference.

BACKGROUND OF THE INVENTION

1. Field of the Invention

Embodiments of present invention relate to the field of display technology, and in particular, to a color filter substrate and display device.

2. Description of the Related Art

Currently, colors displayed by a liquid crystal panels are realized mainly through the color filters. The color filters mainly include the red, the green and the blue primary color filters. The color filters are realized by performing the photolithograph process using the red, green and blue photoresist. Color related indexes, such as color gamut, contrast, the transmissivity of the resultant color filters and the like are all set and can not well adapt to different environments.

SUMMARY OF THE INVENTION

Embodiments of the present invention provides a color filter substrate and a display device, the color gamut of the displayed color thereof can be changed flexibly as necessary, and can be better applied to different environments.

Embodiments of the present invention provide a color filter substrate, comprising: a substrate; a color filter layer provided on the substrate; and a photochromic material, the photochromic material and color filter layer cooperating to display different colors by adjusting light irradiated on the color filter substrate.

Embodiments of the present invention also provide a display device, comprising the color filter substrate as recited in the above embodiments.

BRIEF DESCRIPTION OF THE DRAWINGS

The above and other features of the present invention will become more apparent by describing in detail exemplary embodiments thereof with reference to the accompanying drawings, in which.

DETAILED DESCRIPTION OF PREFERRED EMBODIMENTS OF THE INVENTION

Figure 1:
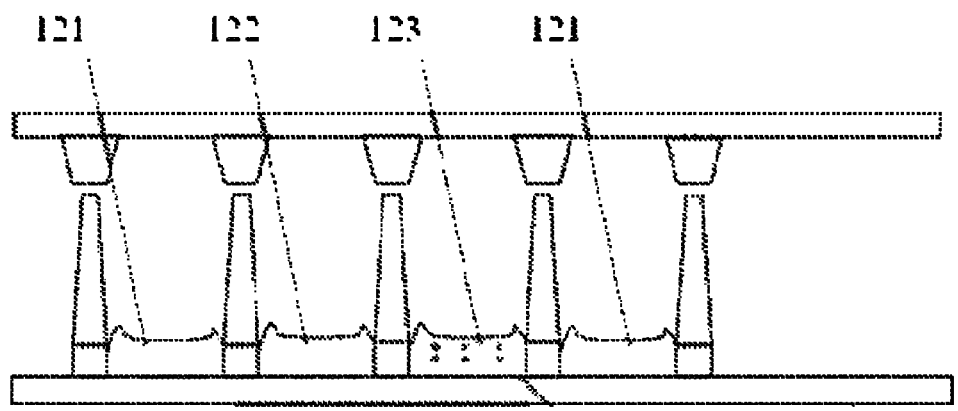
FIG. 1 is a cross-section schematic view of the color filter substrate according to the first exemplary embodiment of the present invention.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

According to the general concept of the present invention, there is provided a color filter substrate, comprises a substrate; a color filter layer provided on the substrate; and a photochromic material, the photochromic material and the color filter layer cooperating to display different colors by adjusting the light irradiated onto the color filter substrate.

According to the general concept of the present invention, the photochromic material is introduced into the color filter substrate and is excited to display different colors by adjusting the light emitted from the backlight source, by this way, the color gamut of the pixel unit is changed. The color filter substrate of the embodiment of the present invention can be better applied to different environment.

FIG. 1 is a cross-section schematic view of the color filter substrate according to the first exemplary embodiment of the present invention. As shown in FIG. 1, this color filter substrate comprises the substrate 11, the color filter layer provided on the substrate and the photochromic material 13 contained in the color filter layer.

The color filter substrate generally comprises the substrate and the color filter layer. Black matrixes are formed on the substrate, and grooves are formed between the adjacent black matrixes. Every three grooves that are continuous arranged are in correspondence to one pixel unit. Every pixel unit comprises three sub-pixel units. That is, every groove is in correspondence to one sub-pixel unit. Every groove is filled with one of the red, green or blue colloid (e.g. photoresist). Color colloid can filter the light emitted from the backlight source, and thus is called color filter layer.

In the embodiment of the present invention, the photochromic material is contained in the color filter layer. In this way, by irradiating the proper light, the photochromic material is caused to display a particular color and the color gamut of the pixel units is thus adjusted. In this way, the color gamut of the pixel units of the color filter substrate can be changed flexibly as necessary, and can be better applied to different environments.

In an exemplary embodiment, the color filter layer comprises a red filter layer unit 121, a blue filter layer unit 122 and a green filter layer unit 123 which are continuous arranged, one or more of these three filter layer units contain the photochromic material. It is appreciated for those skilled in the art that no matter the photochromic material is added into how many of the three filter layer units, the color gamut of the pixel units can be correspondingly changed by choosing the lights having different wavelengths (or strong light). Further, in order to be able to more simply control the lights emitted from the backlight source, the photochromic material 13 can be introduced into only one filter layer unit of the three filter layer units, such as green filter layer unit 123 (as shown in FIG. 1).

Further, in order to make the light displayed by the photochromic material 13 more uniform, the photochromic material 13 can be dispersed uniformly into the color filter layer which has contained photochromic material, for example, the green filter layer unit 123 as shown in FIG. 1.

Figure 2A:
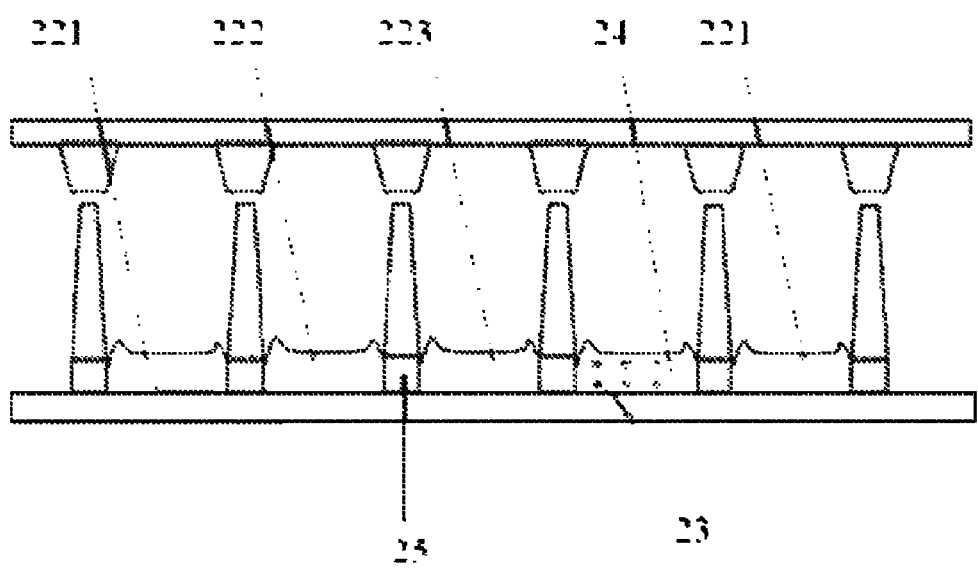
FIGS. 2a and 2b are cross-section schematic views of the color filter substrate according to the second exemplary embodiment of the present invention.
Figure 2B:
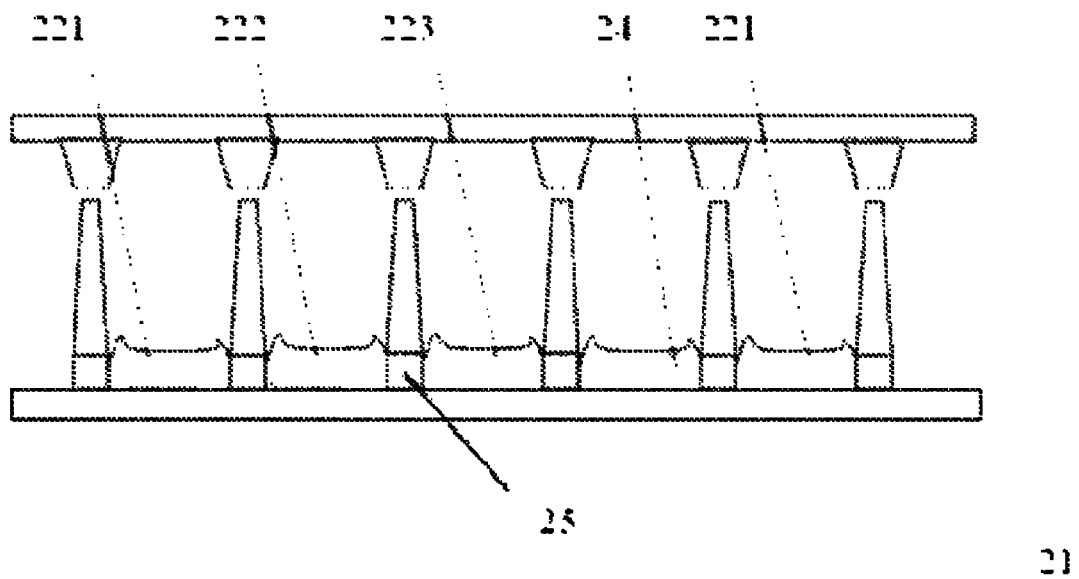

FIGS. 2a and 2b are cross-section schematic views of the color filter substrate according to the second exemplary embodiment of the present invention. As shown in FIGS. 2a and 2b, this color filter substrate comprises the substrate 21 and the color filter layer provided on the substrate 21, wherein the color filter layer comprises the red filter layer unit 221, the blue filter unit 222 and the green filter unit 223. Black matrixes 25 are formed on the substrate 21, and grooves are defined between the adjacent black matrixes 25. Every N adjacent grooves correspond to one pixel unit. Red colloid, blue colloid and green colloid are filled respectively in the corresponding three grooves of the N grooves of every pixel unit to form the red filter layer unit 221, the blue filter layer unit 222 and the green filter layer unit 223, the rest (N−3) grooves are filled with transparent colloid 24 containing photochromic material 23 (see FIG. 2a) or photochromic transparent colloid 24 (see FIG. 2b), wherein N>3.

The situation of filling the grooves with the primary color (red, green, blue) filter layer is identical with that of the display device in the prior art. In both situations, the corresponding grooves are filled with the colloids with specific colors. In the color filter substrate of the exemplary embodiment of the present invention, at least part of grooves are further filled with transparent colloid being mixed with the photochromic material (or filled with photochromic transparent colloid), and thus form one sub-pixel unit of variable color. By exciting the sub-pixel units of variable color to display different colors, the color gamut of the whole pixel units can be adjusted, which makes the display device containing such color filter substrate adapt to different environments.

Further, the transparent colloid for being mixed with the photochromic material can be the colloid with a specific color, or can be the light color or colorless transparent colloid. In one exemplary embodiment, the colorless transparent colloid is selected as the transparent colloid for being mixed with the photochromic material, which makes it simpler to control the color gamut of the whole pixel units.

Theoretically, the value of N can be any nature number larger than 3. But for the consideration of resolution, the value of N should not be too large.

In one exemplary embodiment, in order to make the light displayed by the photochromic material 23 more uniform, the photochromic material 23 can be dispersed uniformly into the transparent colloid 24.

Furthermore, in the color filter substrate of the above first embodiment and second embodiments, the selected photochromic materials comprise non-colloid photochromic materials, such as sodalite (doped with halide ion vacancy), $LiNbO_3$ (doped with Fe or Mo), alumina doped with Bi, $TiO_2$ onto which Ag nanoparticles are loaded, polymolybdic acid, hybrid composed of polyacid and small biological molecules, polyacid containing organic ligands and the like, which thus makes it easier for the photochromic materials to be dispersed into the above color filter layer or transparent colloid.

In the color filter substrate of the second embodiment, the transparent colloid itself for being mixed with the photochromic material can also be photochromic transparent colloid.

Figure 3A:
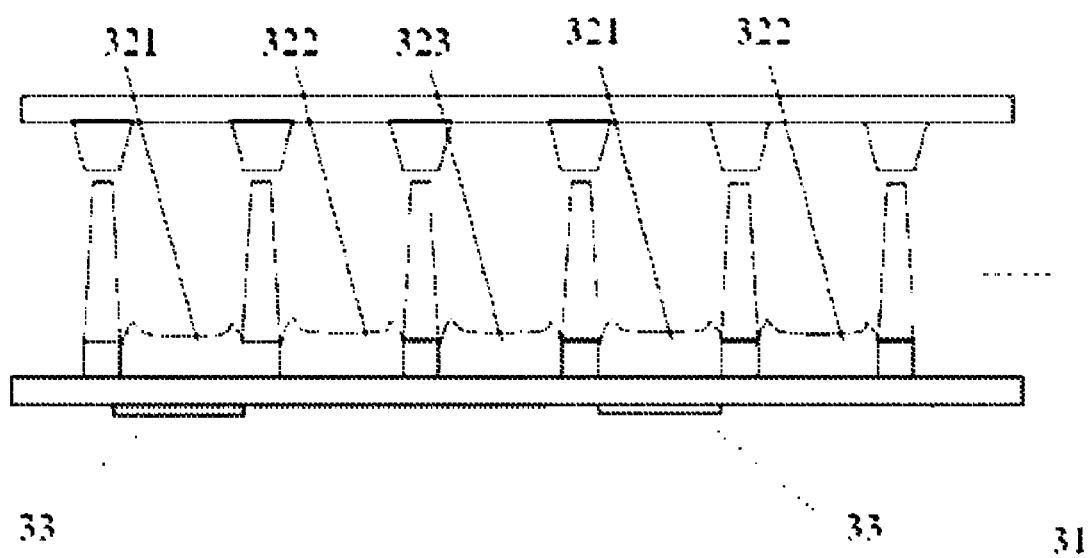
FIGS. 3a and 3b are cross-section schematic views of the color filter substrate according to the third exemplary embodiment of the present invention.
Figure 3B:
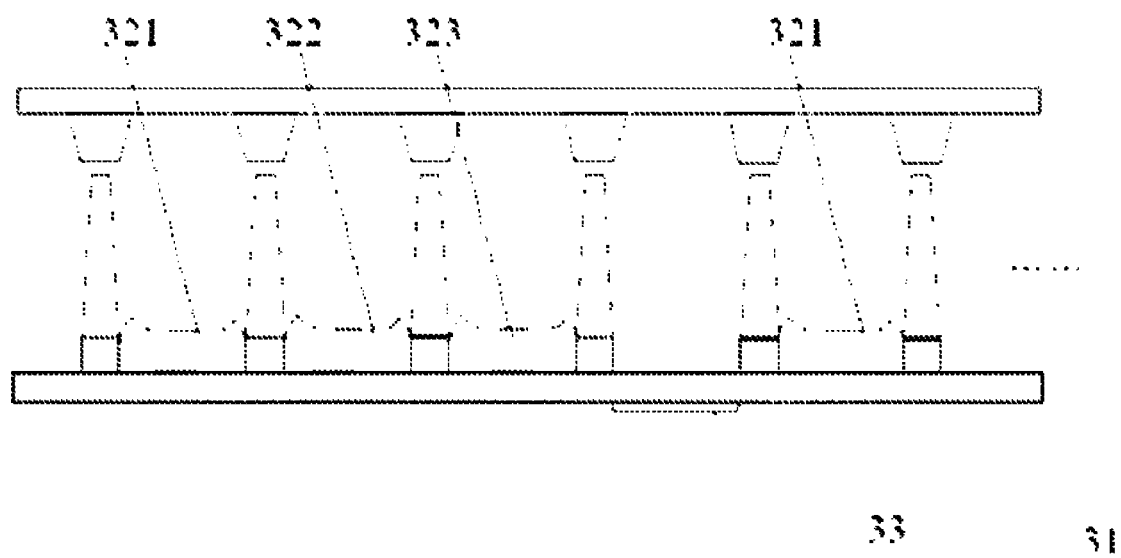

FIGS. 3a and 3b are cross-section schematic views of the color filter substrate according to the third exemplary embodiment of the present invention. As shown in FIGS. 3a and 3b, this color substrate comprises the substrate 31 and the color filter layer provided on the substrate 31, wherein the photochromic material 33 is coated on the substrate 31.

In the color filter substrate of the third embodiment of the present invention, the photochromic material is coated on the substrate, for example, on the outer side of the substrate, thus by adjusting the light irradiated onto the substrate, for example by adjusting the wavelength or the intensity of the light, the substrate can be caused to display light of different colors. After the color of the light displayed by the substrate mixing with the color of the light filtered by the color filter layer, the color gamut of the corresponding pixel unit can be changed. By using the color filter substrate of the present embodiment, the display device can adapt to different environments.

In one exemplary embodiment, the color filter layer comprises the red filter layer unit 321, the blue filter layer unit 322 and the green filter layer unit 323. The photochromic material 33 is coated onto the substrate 31 at the positions that correspond to one or more filter layer units.

It is appreciated for those skilled in the art that either in the case that the photochromic material is coated onto the substrate at the positions that correspond to all the filter layer units or in the case that the photochromic material 33 is coated onto the substrate at the positions that correspond to several filter layer units of all the filter layer units, the suitable light can be selected to excite the photochromic material, and thus the color gamut of the pixel unit can be adjusted. For example, in order to reduce the control difficulty, the photochromic material 33 is provided on the substrate only at the position corresponding to the filter layer unit of one color, such as the red filter layer unit 321, of the three filter layer units, as shown in FIG. 3a.

In one exemplary embodiment, one pixel unit can comprise more than three sub-pixel units, wherein three sub-pixel units comprise the red sub-pixel unit, the blue sub-pixel unit and the green sub-pixel unit, and the rest sub-pixel units are variable sub-pixel units. In particular, N (N>3) grooves can be made to correspond to one pixel unit. The red colloid, the blue colloid and the green colloid are filled in three grooves of the N grooves, respectively, to form the red filter layer unit 321, the blue filter layer unit 322 and the green filter layer unit 323, and the photochromic material 33 are coated at the corresponding positions of the rest (N−3) grooves, wherein N is nature number larger than 3. The embodiment of N=4 is shown in FIG. 3b.

It is noted that the corresponding positions herein coated by the photochromic material 33 comprise a bottom (upper side of the substrate as shown in FIGS. 3a and 3b) of the grooves and/or a side (lower side of the substrate as shown in FIGS. 3a and 3b) opposite to the bottom of the grooves on the substrate. Those skilled in the art can appreciate that the technical effect of the embodiment of the present invention can be achieved either in the case that the photochromic material is coated on the side of the substrate provided with the grooves or in the case that the photochromic material is coated on both sides of the substrate.

In one exemplary embodiment, the photochromic material 33 comprises a colloid, which makes the color displayed by the substrate more uniform.

Further, the photochromic material 33 comprises a derivative of diarylethene.

Generally, heat-irreversible and antifatigue light photochromic phenomenons of the derivative of diarylethene occur in the solution. Either isomer colored after light excitation or colorless isomer before light excitation can exist stably 1000 years or more at room temperature. The coloring-fading cycle process of the isomer can be repeated over 10000 times, and the response time is very short, even shorter than 10 ps. The color-changing efficiency depends on the structure of the substituent. The photochromic property of the monocrystal phase of the derivative of diarylethene is also very stable. Under being excited by ultraviolet light, the derivatives having different structures can be changed from colorless to yellow, red, blue and green, and the colors thereof keep stable in the dark. When the derivative of diarylethene is excited by visible light, the colored crystal is changed into its original colorless state again. For example, by choosing the proper wavelength of the exciting light, the compound can display photochromism panchromatic phenomenon using diarylethene trimer. The light gamut can be broader by using the derivative of diarylethene.

In one exemplary embodiment, the derivative of diarylethene can comprises dithienylethylene.

Those skilled in the art can use other photochromic materials having the colloid structure, such as spiropyran structures, pyrans and spirooxazines, fulgides, acylanilines or Schiff bases, sulfoxides, osazones, semicarbazones, succinic anhydride and the like.

According to the embodiment of a further aspect of the present invention, there is further provided a display device comprising the color filter substrate as recited in any one of the above embodiments.

In the color filter substrate and display device according to the embodiments of the present invention, the photochromic material is introduced in the color filter substrate. In this way, by changing the light emitted from the backlight panel, such as adjusting the wavelength or intensity of the light, the photochromic material is excited to display different colors and the color gamut of the pixel units is thus changed. Thus, the color filter substrate and display device of the embodiments of the present invention can be better applied to different environments.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

What is claimed is:

1. A color filter substrate, comprising:
   a substrate;
   a color filter layer provided on the substrate; and
   a photochromic material, the photochromic material and the color filter layer cooperating to display different colors by adjusting the light irradiated onto the color film substrate,
   wherein the color filter layer comprises a red filter layer unit, a blue filter layer unit and a green filter layer unit;
   wherein black matrixes are formed on the substrate, and grooves are formed between the adjacent black matrixes, at least four grooves corresponding to one pixel unit; and
   wherein three grooves of the at least four grooves corresponding to each pixel unit are filled respectively with a red colloid, a blue colloid and a green colloid to form the red filter layer unit, the blue filter layer unit and the green filter layer unit, and a remainder of the at least four grooves are filled with a transparent colloid containing the photochromic material or a photochromic transparent colloid.

2. The color filter substrate according to claim 1, wherein the photochromic material is dispersed into the color filter layer.

3. The color filter substrate according to claim 2, wherein one or more of the red filter layer unit, the blue filter layer unit and the green filter layer unit contains the photochromic material.

4. The color filter substrate according to claim 2, wherein the photochromic material is dispersed uniformly into the color filter layer containing the photochromic material.

5. The color filter substrate according to claim 1, wherein the photochromic material is dispersed into the transparent colloid.

6. The color filter substrate according to claim 1, wherein the photochromic material is coated onto the substrate.

7. The color filter substrate according to claim 6, wherein the photochromic material is coated onto the substrate at positions that correspond to one or more color filter layer units.

8. The color filter substrate according to claim 6, wherein the photochromic material is coated at the corresponding positions to the rest grooves.

9. The color filter substrate according to claim 6, wherein the photochromic material comprises colloid.

10. The color filter substrate according to claim 9, wherein the photochromic material comprises a derivative of diarylethene.

11. A display device, comprising a color filter substrate, the color filter substrate comprising:
    a substrate;
    a color filter layer provided on the substrate; and
    a photochromic material, the photochromic material and color filter layer cooperating to display different colors by adjusting the light irradiated onto the color film substrate,
    wherein the color filter layer comprises a red filter layer unit, a blue filter layer unit and a green filter layer unit;
    wherein black matrixes are formed on the substrate, and grooves are formed between the adjacent black matrixes, at least four grooves corresponding to one pixel unit; and
    wherein three grooves of the at least four grooves corresponding to each pixel unit are filled respectively with a red colloid, a blue colloid and a green colloid to form the red filter layer unit, the blue filter layer unit and the green filter layer unit, and a remainder of the at least four grooves are filled with a transparent colloid containing the photochromic material or a photochromic transparent colloid.

12. The display device according to claim 11, wherein the photochromic material is dispersed uniformly into the color filter layer.

13. The display device according to claim 12, wherein one or more of the red filter layer unit, the blue filter layer unit and the green filter layer unit contains the photochromic material.

14. The display device according to claim 11, wherein the photochromic material is dispersed into the transparent colloid.

15. The display device according to claim 11, wherein the photochromic material is coated onto the substrate.

16. The display device according to claim 15, wherein the photochromic material is coated onto the substrate at positions that correspond to one or more color filter layer units.

17. The display device according to claim 15, wherein the photochromic material is coated at the corresponding positions to the remaining grooves.

18. The display device according to claim 11, wherein the photochromic material comprises a derivative of diarylethene.

\* \* \* \* \*